3,275,722
PRODUCTION OF DENSE BODIES OF
SILICON CARBIDE
Paul Popper, Westlands, Newcastle-under-Lyme, England, assignor to Power Jets (Research & Development) Limited, London, England, a British company
No Drawing. Filed July 8, 1959, Ser. No. 825,666
1 Claim. (Cl. 264—65)

This invention relates to the production of dense self-bonded bodies of silicon carbide.

Silicon carbide has been bonded hitherto by one or more silicates, by silicon nitride or by silicon. The maximum temperature of use of such materials is limited by the bonding material and not by the silicon carbide itself. Furthermore silicate and silicon nitride-bonded materials are porous and therefore offer a large effective surface to attack by reactive gases or liquids.

It is possible to produce bodies of nearly pure silicon carbide of approximately the theoretical density by a hot-pressing technique, and pure dense silicon carbide thus produced has properties which are much superior to those obtained by other methods. The production of hot-pressed silicon carbide is, however, costly and is limited to bodies of relatively simple shapes.

A process for producing a dense self-bonded body of silicon carbide includes according to the invention forming a body of densely packed granular silicon carbide and powdered carbon from a homogeneous mixture of granular silicon carbide, powdered carbon and a temporary binder, and heating the body in the presence of a vapour consisting essentially of silicon to eliminate the binder and to reaction-sinter the silicon carbide, carbon and silicon whereby the body is converted substantially exclusively into self-bonded silicon carbide.

The term "reaction-sinter" is used herein to mean consolidation by chemical reaction.

In carrying out the invention according to one mode of procedure the following composition is wet mixed for 20 hours:

| | Percent |
|---|---|
| Silicon carbide (80 mesh) | 43 |
| Silicon carbide (220 mesh) | 11 |
| Silicon carbide (700 mesh) | 18 |
| Graphite | 28 |

The powder is then dried and a temporary binder added, which may be for example polyvinyl alcohol added as a 20% solution. The binder is mixed thoroughly with the powder, which is then ready for pressing. The body is pressed to the desired shape at a pressure in the order of 20,000 pounds per square inch and a green body of the correct density is obtained. Heat may be applied to the body after pressing to remove the temporary binder.

The green body is first air-dried at 40° C., then dried further at 110° C. and siliconized by resting it on granular silicon metal contained in a graphite crucible closed by an inverted graphite crucible. This assembly is then heated to a temperature which is of the order of 1800° C. to 2300° C., held at this temperature for a few minutes and then cooled rapidly.

In a test on a body produced by this process the following results were obtained:

Bulk density of green sample and binder ____ 2.05 g./cc.
Weight gain on impregnation with silicon __ 52.0%.
Final bulk density of article ____ 3.03 g./cc.
Apparent porosity ____ 0.5%.
Modulus of rupture ____ 40,000 lb./sq. in.

This process which can conveniently be termed a reaction-sintering process may be carried out at sub-atmospheric pressure, in which case the silicon will boil at a lower temperature. It has been found that when substantially in vacuo i.e. 0.5 mm. mercury, it is possible to obtain complete impregnation and reaction at 1500° C. The temperature of the body itself, however, rises considerably above this figure by virtue of the exothermic nature of the reaction.

The examples of the process of the invention given above are capable of wide variation. The relative amount and particle size of the silicon carbide, silicon and carbon can be varied over a wide range, resulting in bodies of different grain structure and properties. The shaping process for the green body is also not restricted to a pressing operation, but may be carried out by extrusion, casting or other conventional methods. The excess carbon is preferably incorporated in the form of colloidal graphite. The silicon may be added as described by evaporating silicon metal, or by impregnation with liquid silicon, or it may be added from silicon-containing compounds, such as silanes or silicon tetrachloride.

One particular application of the process of the present invention resides in the coating of graphite bodies with a thin layer of silicon carbide to increase the oxidation and abrasion resistance of such bodies. To effect this coating the graphite body is coated, for example by spraying, or dipping, with a layer of a silicon carbide/carbon slip which is thereafter siliconised in accordance with the invention.

What is claimed is:

A process for producing a dense self-bonded body of silicon carbide which includes forming a body of densely packed granular silicon carbide and powdered carbon from a homogeneous mixture of granular silicon carbide, powdered carbon and a temporary binder, and heating the body in vacuo to 1500° C. in the presence of a vapour consisting essentially of silicon to eliminate the binder and to reaction-sinter the silicon carbide, carbon and silicon whereby the body is converted substantially exclusively into self-bonded silicon carbide.

References Cited by the Examiner
UNITED STATES PATENTS

| | | | |
|---|---|---|---|
| 992,698 | 5/1911 | Tone | 23—208 |
| 1,013,701 | 1/1912 | Tone | 106—44 |
| 1,266,478 | 5/1918 | Hutchins | 106—44 X |
| 2,431,326 | 11/1947 | Heyroth | 106—44 X |
| 2,431,327 | 11/1947 | Geiger | 106—44 |
| 2,614,947 | 10/1952 | Heyroth | 117—106 |
| 2,938,807 | 5/1960 | Andersen | 106—44 |
| 3,035,325 | 5/1962 | Nicholson et al. | 23—208 |
| 3,079,273 | 2/1963 | Johnson | 106—44 X |

OTHER REFERENCES

Kainer: "Polyvinyl Alcohol," pub. 1949 (page 40).

TOBIAS E. LEVOW, *Primary Examiner.*

JOHN R. SPECK, *Examiner.*

H. McCARTHY, *Assistant Examiner.*